United States Patent [19]
Frantti et al.

[11] 3,745,414
[45] July 10, 1973

[54] GROUND FAULT CIRCUIT INTERRUPTER

[75] Inventors: Edsel W. Frantti, Pittsburgh, Pa.;
Francis L. Gelzheiser, Fairfield, Conn.

[73] Assignee: Westinghouse Electric Corporation, Pittsburgh, Pa.

[22] Filed: Jan. 21, 1972

[21] Appl. No.: 219,710

[52] U.S. Cl. ............... 317/18 D, 317/27 R, 317/58, 335/6
[51] Int. Cl. ............................................. H02h 3/28
[58] Field of Search ................. 317/18 D, 58, 27 R; 335/37, 39, 6, 7, 8, 36

[56] References Cited
UNITED STATES PATENTS

| | | | |
|---|---|---|---|
| 3,636,482 | 1/1972 | Edmunds | 317/18 D |
| 3,550,047 | 12/1970 | Gelzheiser | 335/39 |
| 3,254,176 | 5/1966 | Gelzheiser | 335/37 |

*Primary Examiner*—James D. Trammell
*Attorney*—A. T. Stratton, L. P. Johns et al.

[57] ABSTRACT

A ground fault circuit interrupter for use between line terminals and load terminals in a load center enclosure for one or more circuit breakers of any current rating in which a ground fault interrupter is provided in conjunction with and in side-by-side relationship with a circuit breaker; the circuit breaker having a trip member for automatically opening the contacts of the circuit breaker, and the ground fault interrupter having means for mechanically actuating the trip member in response to a ground fault.

11 Claims, 5 Drawing Figures

3,745,414

GROUND FAULT CIRCUIT INTERRUPTER

CROSS-REFERENCE TO RELATED APPLICATIONS

This invention is related to an invention disclosed in the application of Kenneth R. Coley, Ser. No. 219,391, filed Jan. 20, 1972.

BACKGROUND OF THE INVENTION

1. Field of the Invention

This invention relates to a ground fault circuit interrupter and more particularly it pertains to a ground fault circuit interrupter in conjunction with one or more circuit breakers contained within a load center enclosure.

2. Description of the Prior Art

In electrical wiring circuits as conventionally installed, a ground fault occurs when an electric current flows to a ground which is not a part of the circuit. Instead of flowing through the ground or neutral wire of the circuit, the fault current takes any other ground path back to the power source. The current can produce electrocution when the human body becomes part of the ground fault. This happens, for example, when a plugged-in radio falls into an occupied bathtub. The fault current in this case flows from the radio through the water and the body to the plumbing and back to the ground at the load center.

Because the ground fault current flows only one way in the wiring circuits, it is possible to detect the presence of ground faults by monitoring the current flow. Under normal conditions, the sum of the currents flowing to the load and back must be substantially equal. If there is a difference in these currents, a ground fault must exist. This is the basis of most of the ground fault interrupters which are on the market. All the current wires are looped around a magnet core in such a manner that under normal conditions no magnetic field is induced. When an unbalance in the current exists, a magnetic field is produced proportional to the unbalance. This then produces a voltage signal in a pickup coil also wound around the magnetic core. This signal is used to actuate breakers which interrupt the current. The magnetic core with its windings is called a differential transformer and for the maximum sensitivity it is made from a high permeability material.

At present, the ground fault interrupters on the market are sold as separate devices which are either portable or mountable apart from the load centers. One problem with that type of ground fault interrupter is that it is connected directly to the load center by additional external wiring or by modification of the load center. Such a procedure has involved additional needless expense due to installation cost as well as resulting in an unduly large and bulky installation and appearance.

SUMMARY OF THE INVENTION

It has been found in accordance with this invention that the foregoing problems may be overcome by providing a ground fault circuit interrupter which is located directly within a load center enclosure and preferably in side-by-side relationship with respect to one or more circuit breakers. The preferred form of the invention involves a circuit breaker having a breaker structure comprising a pair of contacts operable to open and close an electric current between line and load terminals and which structure also comprises a trip member to effect automatic opening of the contacts, the circuit breaker structure being enclosed within a first housing and having an opening through which a portion of the trip member extends. The ground fault interrupter comprises a ground fault detection structure included within a second housing and comprising a mechanically operable member connected to the trip member of the breaker for opening the contacts in response to a ground fault.

The advantage of the device of the present invention includes not only minimized installation cost but also provides for the use of one ground fault interrupter for operating one or more circuit breakers of any current rating.

DESCRIPTION OF THE PREFERRED EMBODIMENT

Figure 1:
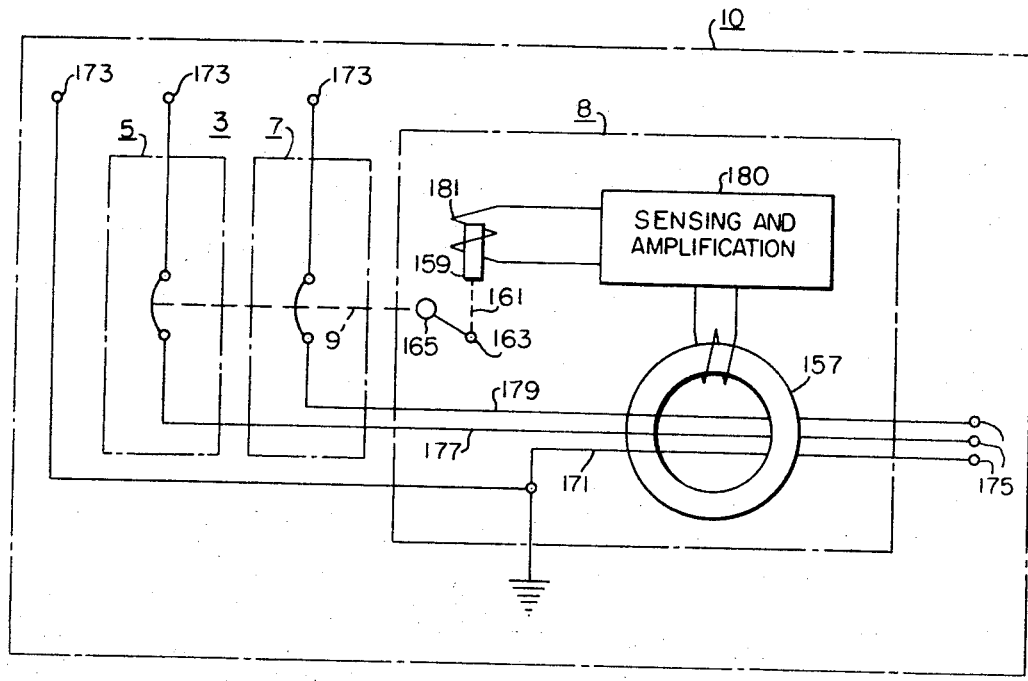
FIG. 1 is a diagrammatic view of the electric circuit by which a pair of circuit breakers, a ground fault detection device together with wiring extending between line terminals and load terminals are contained within a load center enclosure.

As shown diagrammatically in FIG. 1, a two pole circuit breaker 3 comprising circuit breakers 5 and 7 together with a ground fault detection device 8 are provided with a common trip member 9 within a single load center enclosure 10. As shown more particularly in FIG. 2, the circuit breakers 5 and 7 and the ground fault detection device 8 are disposed in abutting side-by-side relationship. The common trip member 9 interconnects the breakers and the device for common tripping in a manner to be hereinafter specifically described. Inasmuch as the circuit breakers 5 and 7 are identical, only the circuit breaker 7 is specifically described, it being understood that the description applies to both circuit breakers.

More particularly, the circuit breakers 5 and 7 are disclosed in U.S. Pat. No. 3,550,047, issued to F. L. Gelzheiser on Dec. 22, 1970 for which reason the description of the circuit breaker 7 is described hereinafter in a more limited manner than is set forth in said patent.

Figure 3:
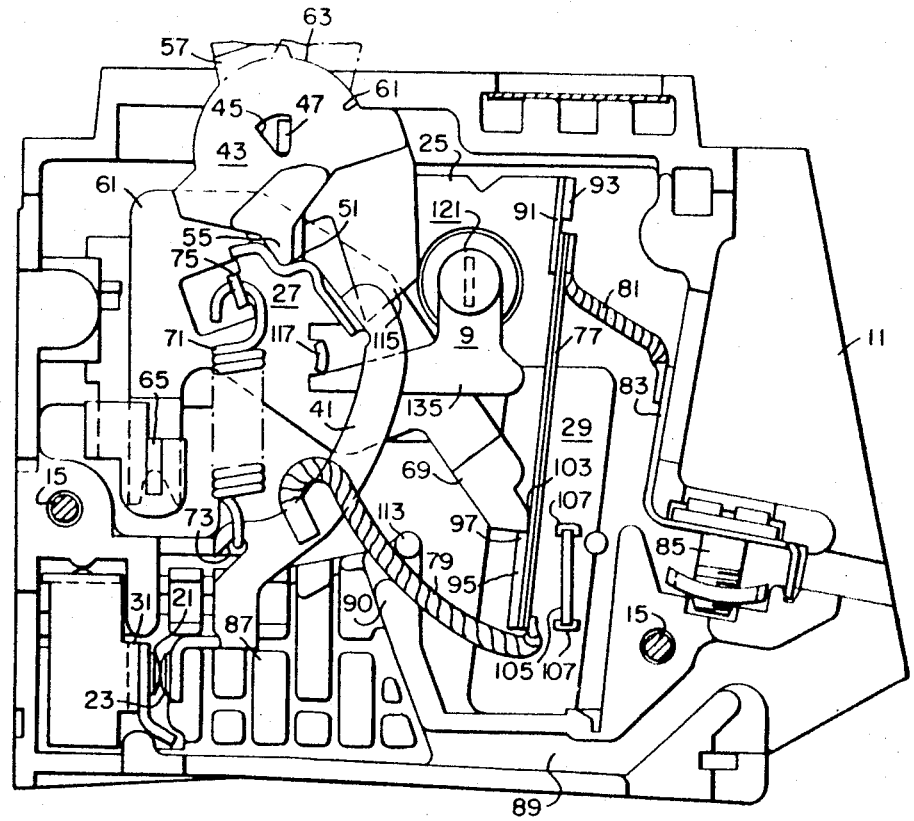
FIG. 3 is a vertical sectional view taken on the line III—III of FIG. 2 and showing a circuit breaker structure in a closed position.
Figure 4:
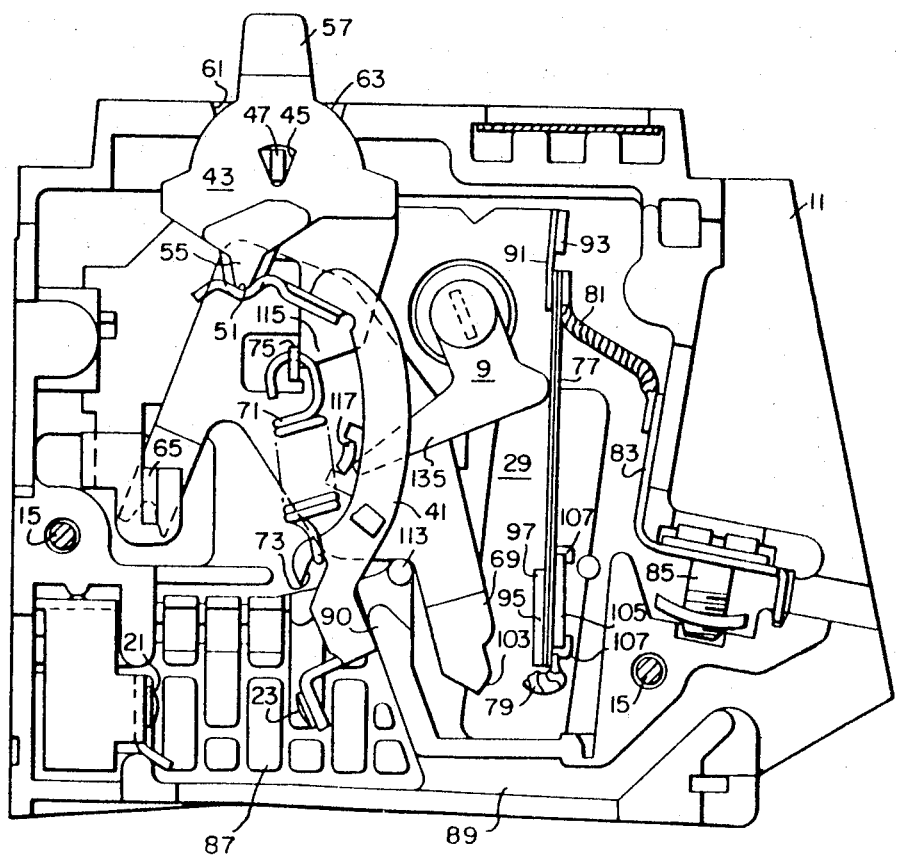
FIG. 4 is a view similar to that of FIG. 3 but showing the structure in the tripped position.

As shown in FIGS. 3 and 4, the circuit breaker 7 comprises an insulating housing base part 11, that comprises a back portion and four side portions extending toward an open-side, and an electrically insulating cover 13 covering the open side of the back portion 11. The housing parts of the two circuit breakers are secured together by rivets 15 (FIG. 3).

Referring to FIG. 3, a circuit breaker mechanism, supported in the housing 11, 13, comprises a stationary contact 21, a movable contact 23, a supporting metal frame 25, an operating mechanism 27, and a trip device 29.

The stationary contact 21 is welded, or otherwise secured, to a plug-in type line terminal structure 31 that is positioned at an opening 33 (FIG. 2) in the housing to resiliently engage a blade or stab 34 in a panelboard or load center when the circuit breaker is mounted in the operating position.

Figure 2:
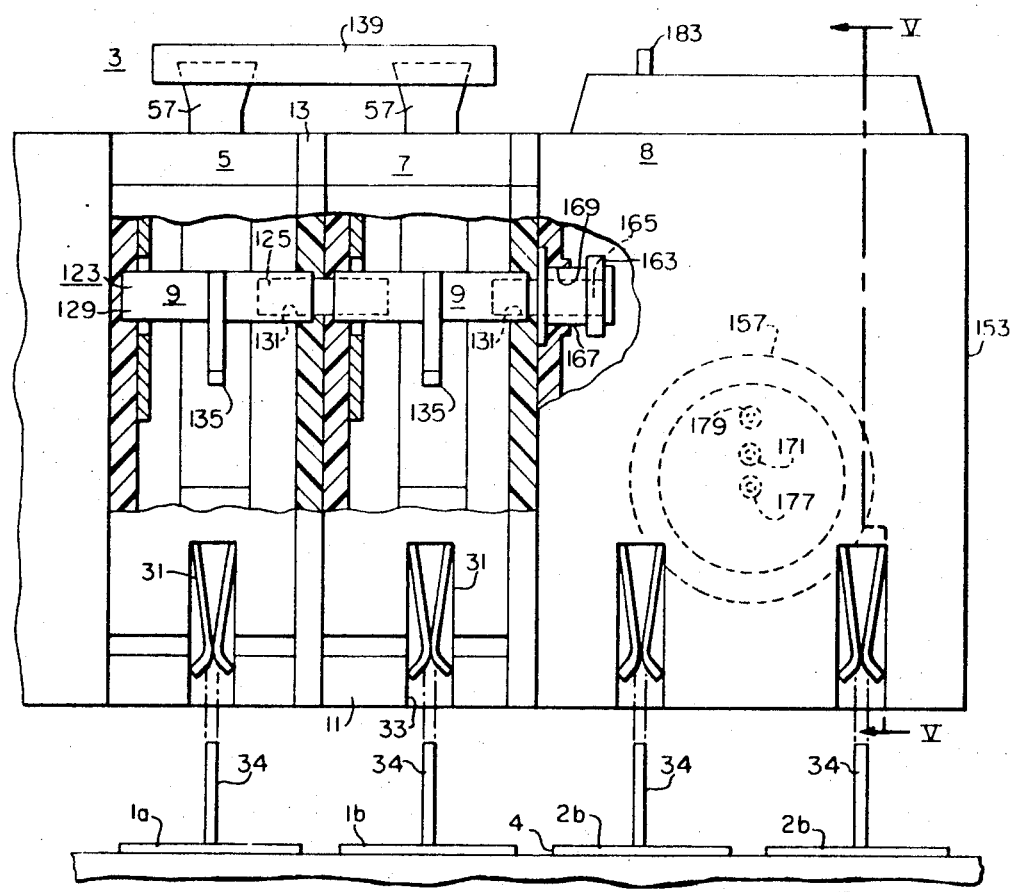
FIG. 2 is an elevational view, with parts broken away, showing a pair of circuit breakers, a ground fault detection device, and stab connectors on which the circuit breakers and ground fault detection device may be detachably mounted.

The stationary contact 21 (FIG. 3) cooperates with the movable contact 23 that is welded or otherwise secured to a small flange portion of a flat metallic generally C-shaped contact arm or switch arm 41. Means for operating the contact arm 41 to the opened and closed positions comprises an insulating operating member indicated generally at 43 having a V-shaped opening 45 therein, which opening receives a projection 47 of the metallic frame 25. The metallic frame 25 is fixedly supported in the housing 11, 13. The operating member 43 is biased outwardly or upward as seen in FIG. 2, by means to be hereinafter described, to a position wherein the lower edges of the projection 47 engage the lower side walls of the V-shaped opening 45. The contact arm 41 is bent over at its upper end, and a slot is provided at the bent over upper end. Depressions 51 are formed in the bent over upper end on opposite sides of the slot. When the parts are in operating position, a projection molded integral with the operating member 43 extends into the slot of the contact arm 41 to position the operating member 43 relative to the contact arm 41, and pivoting portions 55 on opposite sides of the projection pivotally engage in the depressions 51 of the contact arm 41. The operating member 43 has a handle portion 57 molded integral therewith which extends through an opening 61 in the housing to permit manual operation of the circuit breaker. Arcuate surfaces 63 on opposite sides of the handle portion 57 substantially close the opening 61 in all positions of the operating member 43. Motion is transmitted from the operating member 43 to the contact arm 41 when the breaker is manually operated and from the contact arm 41 to the operating member 43 when the breaker is automatically tripped.

The supporting frame 25 supports an insulating pivot 65. A releasable member 67 is pivotally supported at one end thereof on the pivot 65. The other end 69 of the releasable member 67 is latched by the trip means 29 in a manner to be hereinafter described. Except for the trip means, the operating mechanism 27 is more specifically described in a patent to F. L. Gelzheizer U.S. Pat. No. 3,254,176.

As is more specifically described in said U.S. Pat. No. 3,254,176, the ends of the releasable member 67 are offset and disposed along a plane which is parallel to a plane in which the main body portion of the releasable member 67 is disposed. A spring 71 is connected, under tension, at one end in a slot 73 in the contact arm 41, and at the other end in a slot in a projection 75 that extends from the main body portion of the releasable member 67.

The contact arm 41 is electrically connected to the lower end of a bimetal 77 by means of a flexible conductor 79. The bimetal 77 is part of the trip device 29 that will be hereinafter described. A flexible conductor 81 connects the upper end of the bimetal 77 with a terminal strap 83 that extends through an opening in the end wall of the housing. A terminal connector 85 is connected to the external end of the terminal strap 83 to permit connection of the circuit breaker in a circuit in a manner well known in the art. The closed circuit through the breaker extends from the terminal 31 through the stationary contact 21, movable contact 23, contact arm 41, flexible conductor 79, current-carrying bimetal 77, flexible conductor 81, terminal strap 83, to a conducting line that would be connected to the terminal strap 83 by means of the terminal connector 85. Since the movable contact arm 41 extends downwardly from its pivot, the arc is established adjacent the bottom of the housing in an arc chamber 87 which is connected by a vent passage 89 to an opening in the end of the housing beneath the terminal connector 85.

When the releasable member 67 is in the reset or latched position shown in FIG. 3, the circuit breaker may be manually operated by operation of the operating member 43. Movement of the operating member 43 in a clockwise direction from the "on" or closed position seen in FIG. 3 to the "off" or open position carries the upper end of the contact arm 41 to the left of the line of action of the spring 71 whereupon the spring acts to move the contact arm 41 with a snap action to the open position. The contact arm 41 is stopped in the open position by engagement thereof with a molded projection 90. As can be understood with reference to FIG. 3, the spring 71 biases the contact arm 41 frontward into engagement with the operating member 43 to bias the operating member 43 against the lower edges of the projection 47 about which the operating member 43 pivots. Movement of the operating member 43 in a counterclockwise direction from the "off" position to the "on" position moves the upper end of the contact arm 41 to the right of the line of action of the spring 71 to move the contact arm 41 to the closed position seen in FIG. 3.

The trip device 29 comprises the bimetal 77 which is a flat member that is secured at the upper end thereof to the flat face of a flat leaf spring 91. The upper end of the flat leaf spring 91 is secured at a flat face thereof to a flat portion of a projection 93 of the frame 25. The frame 25 is a flat metallic member that is secured in place in the housing between projections of the molded insulating housing, and the projection 93 is bent over to extend in a direction generally normal to the plane of the flat supporting plate 25. The flat spring 91 is fixedly secured to the projection 93 to support the bimetal 77. A rigid armature latch 95 of magnetic material is welded or otherwise fixedly secured to the lower end of the bimetal 77 on the high expansion side of the bimetal 77. The upper end 97 of the armature 95 serves as a latch surface engaging the latch end 96 of the releasable member 67 to latch the releasable member 67 in the latched position seen in FIG. 3. The spring 91 biases the bimetal 77 to the left (FIG. 3), and a stop portion 103 at the latch end 69 of the releasable member 67 engages the bimetal 77 to limit movement of the bimetal to the left and to determine the amount of latch engagement between the releasable member 67 and the armature 97. A flat rigid magnetic member 105 is stationarily supported on the housing nested in electrically insulating projections 107 on the housing part 11 and similar projections on the housing part 13.

The circuit breaker is shown in FIG. 3 in the closed position with the releasable member 67 being latched on the armature 95. Upon the occurrence of a sustained overload current above a first predetermined value, the current-carrying bimetal 77 is heated by the current flowing therethrough, and the bimetal deflects with the lower end thereof moving to the right to move the armature 95 out of latching engagement with the releasable member 67 thereby releasing the releasable member 67. When the releasable member 67 is released, the spring 71 acts to rotate the releasable member 67 in a clockwise direction about the pivot 65 until the releasable member 67 is stopped by engagement thereof with a molded projection 113 of the housing part 11. During this movement, the line of action of the spring 71 moves to the right of the pivot 55, 51, whereupon the spring 71 biases the contact arm 41 to the open position and moves the contact arm 41 so that the line of action of the force exerted by the spring on the operating member 43 moves across the pivot 45, 47 and actuates the operating member 43 to the tripped position shown in FIG. 4, which tripped position is intermediate the "on" and "off" positions. The operating member 43 is stopped in the intermediate position when a projection 115 thereon engages the projection 75 of the releasable member 67. Positive separation of the contacts is provided during a tripping operation by the provision of a projection 117 extending from the releasable member 67 which engages the contact arm 41 with a swiping action if the contacts are slow in opening due to sticking or other reasons.

The circuit breaker is trip-free in that the breaker will automatically trip open even if the operating member 43 is held in the closed position.

Before the breaker can be operated following an automatic tripping operation, the releasable member 67 must be reset. This is accomplished by moving the operating member 43 from the tripped position (FIG. 4) clockwise to a position slightly beyond the full "off" or open position. During this movement, the projection 115 on the operating member 43 operates against the projection 75 of the releasable member 67 to move the releasable member 67 counterclockwise to a position wherein the latch surface at the latch end 69 is just above the latch surface 97 of the armature 95 whereupon the spring 91 moves the bimetal 77 (which has cooled and straightened since no current has been flowing therethrough under the tripped condition) to the left until the bimetal 77 engages the stop 103 of the releasable member 67 to thereby relatch the releasable member 67 in the position seen in FIG. 3. Thereafter, the circuit breaker can be manually operated in the same manner as was hereinbefore described.

The circuit breaker is instantaneously tripped upon the occurrence of a short circuit or severe overload current above a second predetermined value higher than the first predetermined value by operation of the electromagnetic trip of the trip means 29. As can be understood with reference to FIG. 3, the current passing through the bimetal 77 generates magnetic flux which operates through the armature 95, the air gaps between the armature 95 and the stationary magnetic member 105, and through the stationary magnetic member 105. When the current reaches the second predetermined value, this magnetic flux is strong enough to attract the armature 95 toward the stationary magnetic member 105, and the spring 91 flexes to permit movement of the armature 95 toward the stationary magnetic member 105 to the magnetically-tripped position seen in FIG. 4 to thereby release the releasable member 67. Upon release of the releasable member 67, the circuit breaker is tripped open in the same manner as was hereinbefore described with regard to the time-delay thermal tripping operation. The circuit breaker is reset and relatched following a magnetic tripping operation in the same manner as was hereinbefore described following the thermal tripping operation.

As set forth above with respect to FIG. 2, it will be noted that two circuit breakers 5 and 7 are mounted in a side-by-side relationship to provide a two-pole circuit breaker. Each of the circuit breakers comprises a separate independent circuit-breaker structure. The common trip member 9 is provided in order to provide that both breakers trip when either of the breakers is tripped. The common trip member 9 comprises two electrically insulating members 121 and 123 tied together for common movement by an insulating connecting member 125. Each of the members 121, 123 is supported at one end thereof in an opening 129 in the back wall of the associated housing part 11 and at the other end thereof in an opening 131 in the associated cover 13. The members 121, 123 are cylindrical at the opposite ends thereof and the openings 129, 131 are cylindrical to support the members 121, 123 for pivotal movement about the common axis of the members 121, 123. Each of the members 121, 123 is provided with a slot therein, and the flat connecting member 125 is positioned in the slots of the members 121, 123 to provide for common pivotal movement of the members 121, 123. Each of the members 121, 123 is a molded insulating member provided with an actuating part 135 that is molded integral therewith.

As can be seen in FIG. 3, each of the actuating parts 135 is positioned at the one end thereof under the associated projection 117 of the associated releasable member 67 with the other end thereof being positioned opposite the associated bimetal 77. Upon the occurrence of an overload in either of the circuit breakers, the associated releasable member 67 drops to the tripped position seen in FIG. 4 during which movement the projection 117 on the releasable member 67 engages the part 135 of the common trip member 9 to rotate the common trip member 9 in a counterclockwise (FIGS. 3 and 4) direction whereupon the member 135 of the adjacent circuit breaker is moved to engage the associated bimetal 77 to move the associated bimetal 77 and armature 95 to the unlatching position thereby releasing the releasable member 67 of the adjacent circuit breaker whereupon the adjacent circuit breaker is tripped open in the same manner as was hereinbefore described. With each of the bimetals 77 being supported on the associated spring 91, it can be understood that there is less resistance to tripping movement of the bimetal and armature in the adjacent circuit breaker than would be the case if the bimetal 77 were mounted on the projection 93 in which case the relatively stiff bimetal would provide additional resistance to tripping movement of the bimetal and armature in the adjacent breaker.

As shown in FIG. 2, a common handle tie 139 is connected to the two handles 57 to provide for simultaneous operation of the circuit breaker 3. Thus, following a tripping operation of the two-pole circuit breaker the two poles are simultaneously reset by simultaneous movement of the handles 57 to the reset position, whereupon the projections 117 of the adjacent breakers will be moved to the position seen in FIG. 3 and the common trip member 9 can then move to an inactive position such as the position seen in FIG. 3. Although it is not necessary for effective operation of the circuit breaker, suitable spring means could be provided to bias the common trip member 9 to the particular inactive position seen in FIG. 3.

Figure 5:
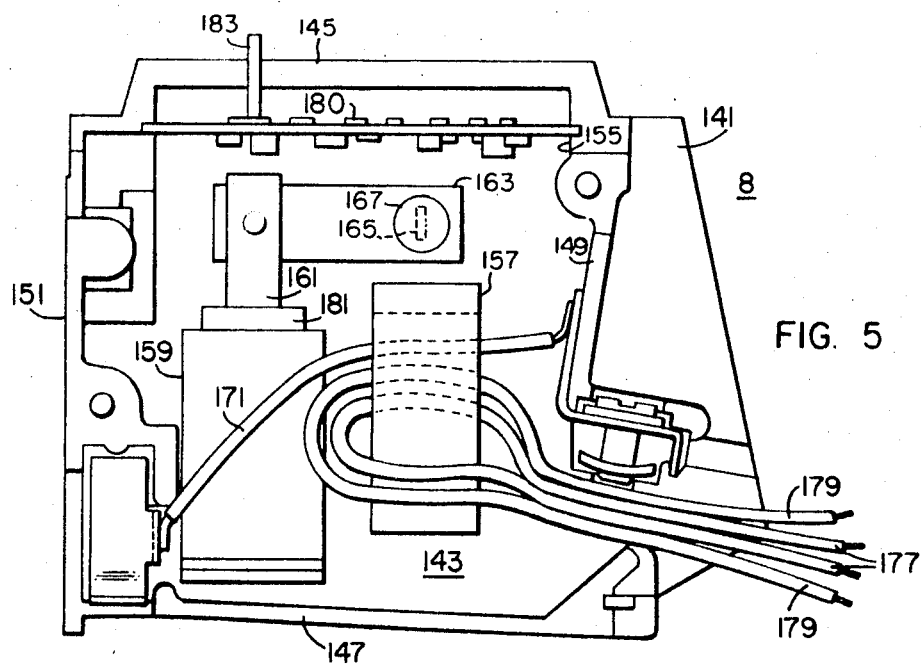
FIG. 5 is a vertical sectional view taken on the line V—V of FIG. 2 showing the ground fault detection structure.

Generally, the ground fault detection device is of the type disclosed in greater detail in the applications, Ser. Nos. 158,336, 158,337, and 158,338, filed June 30, 1971, and all assigned to the same assignee as this application. The ground fault detection device 8 as shown in FIG. 5 includes an electrically insulating housing 141 that comprises a side portion 143, a top portion 145, a bottom portion 147, and two opposite end portions 149 and 151. The portions 143-151 together with an electrically insulating cover 153 (FIG. 2) form an enclosed chamber 155 in which the ground fault detection structure is contained. The structure includes a differential transformer or toroid 157, a solenoid 159 having a plunger 161, and a connecting link 163. As shown more particularly in FIG. 2, the connecting link 163 is attached to a connecting member 165 which is rotatably mounted with a sleeve 167 within an opening 169 (FIG. 2). The connecting member 165 extends through the sleeve and into the opening 131 at the right end of the trip member 9, which opening is adapted to receive the connecting member 165 and to be rotated thereby when a rotational force is applied to the connecting member 165 by the solenoid 159.

As shown in FIGS. 1, 2 and 5, a neutral line 171 extends through the toroid 157 and has opposite ends connected to a line terminal 173 and a load terminal 175. Likewise, circuit wires 177 and 179 extend through the toroid and are connected through the breakers 5 and 7 to line terminals 173 as well as to load terminals 175. It is to be noted that the neutral line 171 extends from the terminal clip (FIG. 5) to a screw type terminal and that the other terminal clip (FIG. 2) of the ground fault indication device 8 is merely provided for structural support for said device.

In addition to the foregoing, the ground fault detection device 8 includes an electronic or circuit board 180 (FIGS. 1 and 5) for sensing and amplifying any signal derived from an unbalance of current in the toroid, which signal is amplified and transmitted to a coil 181 of the solenoid 159.

Accordingly, so long as normal operating conditions prevail, the circuit breakers 5 and 7 may be actuated manually between opened and closed positions without regard to the ground fault detection device 8. On the other hand, when normal conditions are interrupted, such as where a ground fault occurs between one line and ground, the solenoid 159 is actuated to rotate the connecting member 165, and thereby trip the breakers 5 and 7 to the open circuit positions.

A test switch 183 (FIGS. 2 and 5) is provided to test the condition of the ground fault detection device 8 prior to resetting the circuit breakers 5 and 7.

The area within the dotted lines of FIG. 1 shows diagramatically that the tripping motion is transmitted from the area to one or more circuit breakers by the same trip rod 9, which is used to join single pole breakers into multiple pole breakers. As shown, the flow of power is from one of the breakers 5 and 7 into the sensing unit, where the neutral wire 171 also enters. The power to the load terminals then comes from the sensing unit. The neutral line for the protected circuit must also come from the sensing unit. This structure enables all the power leads to pass through the differential transformer 157, which is inside the detecting device.

The ground fault interrupter constructed in the foregoing manner is novel in that no additional circuit wiring is necessary, and the device can very easily be introduced into already installed load centers. Finally, one unit can be used to operate the various ratings of breakers available.

What is claimed is:

1. A ground fault circuit interrupter for use between line terminals and load terminals, the interrupter comprising a circuit breaker having a first electrically insulating housing, a circuit breaker structure within the housing and comprising a pair of contacts operable to open and close an electric circuit between the line and load terminals, the structure also comprising a trip member to effect automatic opening of the contacts and having a portion extending through a first opening in the housing, ground fault detection means for monitoring a circuit connected to the load terminals, the ground fault detection means comprising a second electrically insulating housing and a ground fault detection structure within the second housing, the first and second housings being in a side-by-side relationship, and means operatively connecting the ground fault detection structure to said portion of the trip member for opening the contacts in response to a ground fault.

2. The ground fault circuit interrupter according to claim 1 in which the circuit breaker and the ground fault detection means are located within a load center enclosure.

3. The ground fault interrupter according to claim 1 in which the second housing is provided with a second opening, the first and second openings being aligned when the first and second housings are disposed side-by-side, and the means operatively connecting the ground fault detection structure to said portion of the trip member comprising a connecting member extending through the aligned openings.

4. The ground fault interrupter according to claim 3 in which the ground fault detection structure comprises electromagnetic means for moving the connecting member when a ground fault occurs.

5. The ground fault interrupter according to claim 4 in which the ground fault detection structure comprises link means operatively connecting the electromagnetic means to said connecting member for rotating said connecting member.

6. The ground fault interrupter according to claim 1 in which at least two circuit breaker structures are operatively connected to the ground fault detection structure.

7. A ground fault circuit interrupter for use in a load center having line terminals and load terminals, the interrupter comprising at least one circuit breaker structure comprising a pair of contacts operable to open and close an electric circuit between the line and load terminals, the structure also comprising a trip member to effect automatic opening of the contacts, ground fault detection means for monitoring a circuit connected to the load terminals and comprising a ground fault detection structure, the circuit breaker structure and the ground fault detection structure being contained in an electrically insulating housing structure, and operative means connecting the ground fault detection structure to the trip member for opening the contacts in response to a ground fault.

8. The ground fault circuit interrupter according to claim 7 in which the insulating housing structure is contained within a load center enclosure.

9. The ground fault circuit interrupter according to claim 7 in which the insulating housing structure comprises a first insulating housing in which the circuit breaker structure is contained and a second insulating housing in which the ground fault detection structure is contained.

10. The ground fault circuit interrupter according to claim 7 in which the circuit breaker structure and the ground fault detection structure are in side-by-side relationship.

11. The ground fault circuit interrupter according to claim 9 in which the first and second insulating housings are in side-by-side relationship.

* * * * *